(12) United States Patent  
Watkins

(10) Patent No.: US 7,039,298 B1
(45) Date of Patent: May 2, 2006

(54) EXTRACTION OF AUDIO/VISUAL SEGMENT FROM DIGITAL VERSATILE DISK CONTENT

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/539,681

(22) Filed: Mar. 30, 2000

(51) Int. Cl.
*H04N 5/781* (2006.01)

(52) U.S. Cl. ....................... 386/125; 386/126
(58) Field of Classification Search .............. 386/45, 386/125, 126, 131; 360/13, 15; 369/83–85; H04N 5/76, H04N 5/781
See application file for complete search history.

(56) References Cited

U.S. PATENT DOCUMENTS

| | | | | |
|---|---|---|---|---|
| 6,185,736 | B1* | 2/2001 | Ueno | 725/95 |
| 6,314,518 | B1* | 11/2001 | Linnartz | 713/176 |
| 6,549,671 | B1* | 4/2003 | Miyagoshi et al. | 382/239 |
| 2003/0086688 | A1* | 5/2003 | Saeki et al. | 386/65 |
| 2003/0190152 | A1* | 10/2003 | Okada et al. | 386/95 |
| 2003/0194211 | A1* | 10/2003 | Abecassis | 386/69 |
| 2003/0206727 | A1* | 11/2003 | Sawabe et al. | 386/96 |
| 2004/0068688 | A1* | 4/2004 | Huang | 714/758 |

* cited by examiner

*Primary Examiner*—Thai Tran
(74) *Attorney, Agent, or Firm*—Christopher P. Maiorana, P.C.

(57) ABSTRACT

A segment of audio/visual (A/V) content is extracted from the overall DVD content of a DVD program or disk. A DVD player with A/V segment extraction functionality receives commands from a user that identify start and stop points in the DVD content for the desired A/V segment and that specify each of the available DVD options or features which may be included in the extracted A/V segment. Relevant blocks of data within the DVD data structure of the DVD content are identified and new DVD-standard information for assembling a new complete DVD data structure containing only the extracted A/V segment and the available DVD options and features and additional non-DVD-standard information that can be played back on a conventional DVD player are added. The complete DVD data structure is assembled and either stored locally or sent to a remote destination device for remote playback, re-editing or other use.

21 Claims, 6 Drawing Sheets

EXTRACTION OF AUDIO/VISUAL SEGMENT FROM DIGITAL VERSATILE DISK CONTENT

FIELD OF THE INVENTION

This invention relates to digital versatile disks (DVD), also known as digital video disks. More particularly, the present invention relates to extracting a segment, or "clip," from a DVD-encoded audio/visual (A/V) bitstream, which can be stored, played or edited locally or sent to a remote destination. As a result, a new and improved apparatus and method permits a user to easily select a segment within a larger DVD title or disk and then assembles a fully DVD-compliant bitstream for the selected segment, including any options available in the original DVD content.

BACKGROUND OF THE INVENTION

The standards that have been developed for digital versatile disks (DVDs) define many features that were not available in previous standard video technologies, such as VHS tape and laser disc. Such additional features include the ability to allow the user to interact with the playback of DVD audio/visual (A/V) content to customize the presentation of the DVD A/V content for the user's preferences. The author of the DVD A/V content, however, must enable many of these features in the original production of the DVD A/V content for the features to be available to the user. For example, the author may choose to incorporate subtitles in DVD A/V content, and the user can choose which language, if any, in which to view the subtitles. An author may also re-film or reedit some scenes of a motion picture for different purposes, such as to achieve any desired rating by the Motion Picture Association of America (e.g. NC-17, R, PG-13, PG or G), or to change the story or ending. The author may then include each different version of the scenes in the DVD A/V content with formatting for "parental" control which causes the playback of the motion picture to branch between scenes so as to present only the version with the desired rating. The user may select which version or which scenes to view. A DVD A/V content author may also shoot some scenes of a motion picture from multiple angles and incorporate all of the angles, up to nine angles, in the DVD A/V content for the user to select which angle of the scene to view. Blocks of digital data for the angles are interleaved together onto the DVD disk so that the playback can branch between scenes with seamless A/V playback.

Playback using any of the above features typically requires complete playback of the entire DVD A/V content with options for pausing, fast forwarding, fast reversing, etc. DVD players also typically provide for branching to specific points within the DVD A/V content to begin playback at these points, such as at the start of chapters or scenes. DVD players, however, do not permit specifying an actual address within the DVD bitstream (the compressed, DVD-encoded digital data that represents the DVD content) for a location to start the playback. Recording in the DVD format is a feature that is typically not available in DVD players, since DVD recording technology is expensive. An author of DVD content, therefore, performs all authoring and editing tasks on the DVD content prior to storing the completed DVD bitstream on media. Generally, DVD A/V content is encoded in the MPEG-2 (Motion Picture Expert Group) format, so editing features typically provide cut, paste and other edit commands for creating MPEG-2 files prior to creating a DVD disk on which is stored the DVD content. Such editing features are not provided in DVD players for playing back DVD content from the DVD disk, since the users only need to view the DVD A/V content, not create it.

DVD A/V content is generally decoded by a DVD player into conventional A/V content for presentation on a conventional display (e.g. a television). It is generally possible, therefore, to play back the DVD A/V content and record the conventional A/V content generated thereby. For example, the DVD A/V content may be played back to a video cassette recorder (VCR), which records the conventional A/V content as it would be played back on a conventional television. To record only a short segment of the DVD A/V content as it is being played back, however, requires a user to view the real-time playback of the DVD content and to start and stop the VCR recording at the desired points during the playback. Capturing the exact desired segment of the playback is, thus, an inexact or hit-or-miss situation.

Additionally, the A/V content recorded by a conventional VCR contains only the audio and visual material that is played back to the television. Any other available features, such as the subtitles, the parental features, the multiple angles, etc., cannot be simultaneously recorded by the VCR, since they cannot all be played back simultaneously and the VCR can only record one stream of A/V content at a time. In other words, to record the DVD A/V content with all of the desired features, the DVD A/V content must be played back and recorded several times, each time with a different one of the desired features selected. In doing so, however, the enhanced capabilities provided by these other features are absent in the recorded A/V content. Thus, the user can play back the recorded A/V content only as it was recorded, without the user-selection of the DVD features available in the original DVD content. Also, the screen resolution (i.e. the horizontal lines of resolution, or the horizontal-by-vertical pixel resolution) of the recorded A/V content depends on the resolution of the played back video, which, for conventional television, is less than the full resolution capabilities of the DVD standards. Thus, some of the quality of the DVD A/V content is lost. Furthermore, since the VCR does not record the exact digital data from the original DVD content, but only an analog approximation thereof, such recording is invariably "lossy" by nature (i.e. naturally loses some detail or quality in the recording).

It is with respect to these and other background considerations that the present invention has evolved.

SUMMARY OF THE INVENTION

The present invention relates to a new and improved method and apparatus for accessing DVD A/V content that permits a user to specify start and stop points between which a DVD A/V segment is extracted from the full DVD A/V content, including any specified DVD features which are available that relate to the desired segment. Data for a complete DVD program, or title, as would be stored on a complete DVD disk, is assembled from the portion of the original DVD bitstream that includes the specified segment along with header and navigation information required according to the DVD standards to be able to play back DVD A/V content.

Generally, the user selects a menu option to extract a segment of the DVD A/V content and is presented with a display screen to navigate through the DVD A/V content to locate the start frame and the stop frame for the A/V segment. After selecting the start and stop frames, the user is presented with a menu for selecting options to be included in the A/V segment. Such options may include the video angles, the audio tracks, the parental control and other standard DVD features available in the DVD A/V content for the selected segment. The options may also include additional information that is not defined in the DVD standards, such as the time of the extraction, a segment number identifier, the search used to locate the segment, the source of the segment, the name of the person who extracted the segment and/or any other relevant information which are added in accordance with the present invention. After the user has selected all of the features and options to be included in the A/V segment, all of the DVD-specific information, such as headers and navigation information, is assembled for a completed DVD title as would be represented by an entire DVD disk. The DVD bitstream is played back and the relevant video object units are extracted and assembled together with the DVD-specific information to form the completed DVD program.

These and other improvements are achieved in a method for manipulating a segment of DVD content. The segment is capable of being played back by a DVD device. First DVD data is provided that contains both content data and first formatting data for DVD content that is capable of being played back by a DVD device. A portion of the content data that represents a segment of the DVD content is copied. Second formatting data is determined for the copied portion of the content data necessary for forming second DVD data for the segment of the DVD content, and the second DVD data is assembled from the copied portion of the content data and the second formatting data. The second DVD data is also capable of being played back by a DVD device.

Start and stop points are preferably selected within the DVD content for the segment. Additionally, blocks of relevant data are identified between the start and stop points for the segment of the DVD content. Furthermore, DVD-standard information is determined for the identified blocks of data. The second data is assembled from the identified blocks of data and the DVD-standard information. The DVD content is preferably played back to identify the blocks of data and then played back a second time to assemble the second DVD data by reading the blocks of data between the start and stop points, copying the identified blocks of data and combining the copied blocks of data with the DVD-standard formatting information.

The second DVD data is preferably either stored locally or sent to a remote DVD device for local and/or remote use or playback of the segment of DVD content. For sending to the remote DVD device, it is preferable to send the second DVD data as soon as it is assembled without copying it to local memory. Assembling and sending the second DVD data are preferably performed substantially concurrently by sequentially assembling a plurality of sub-portions of the second DVD data and sending each sub-portion to the remote DVD device while concurrently assembling the next sequential sub-portion.

Non-DVD-standard information and/or conventional DVD features are preferably selected and assembled into the second DVD data. The non-DVD-standard information preferably relates to or identifies the segment of DVD content and/or the extraction of the segment. Blocks of data relating to selected ones of the conventional DVD features are identified within the content data.

The previously mentioned and other improvements are also achieved in a DVD device which interacts with a media containing a first DVD data structure capable of being played back by a conventional DVD player and which includes a desired segment of DVD content. The DVD device comprises a DVD drive, a DVD decoder and a controller. The DVD drive is receptive of the media. The DVD decoder is connected to the DVD drive. The controller is connected to the DVD drive and the DVD decoder and is operative to control the DVD drive to supply signals from the media and to control the DVD decoder to assemble the first DVD data structure from the signals supplied by the DVD drive. The controller is further operative to identify the desired segment from the first DVD data structure, to control the DVD decoder to read the desired segment from the DVD content of the first DVD data structure, and to assemble the desired segment into a second DVD data structure which is different from the first DVD data structure and which is capable of being played back by a conventional DVD player.

The DVD content preferably comprises conventional DVD features for the desired segment between user-provided start and stop points that identify the desired segment. Desired ones of the conventional DVD features are included in the second DVD data structure. Additionally, non-DVD-standard information, provided by the user and related to or identifying the desired segment and/or the extraction thereof, is included in the second DVD data structure.

The DVD device preferably further comprises a communication interface and/or a memory device connected to the DVD decoder and the controller. The communication interface communicates with a remote device, and the controller preferably routes the second DVD data structure to the communication interface, which sends it to the remote device. Alternatively, the controller stores the second DVD data structure in the memory device. For sending the second DVD data structure to the remote destination device, however, the controller preferably assembles the second DVD data structure in sequential portions thereof and routes each portion to the communication interface while assembling the next sequential portion. The communication interface preferably sends each sequential portion upon receipt thereof to the remote device.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

DETAILED DESCRIPTION

Figure 1:
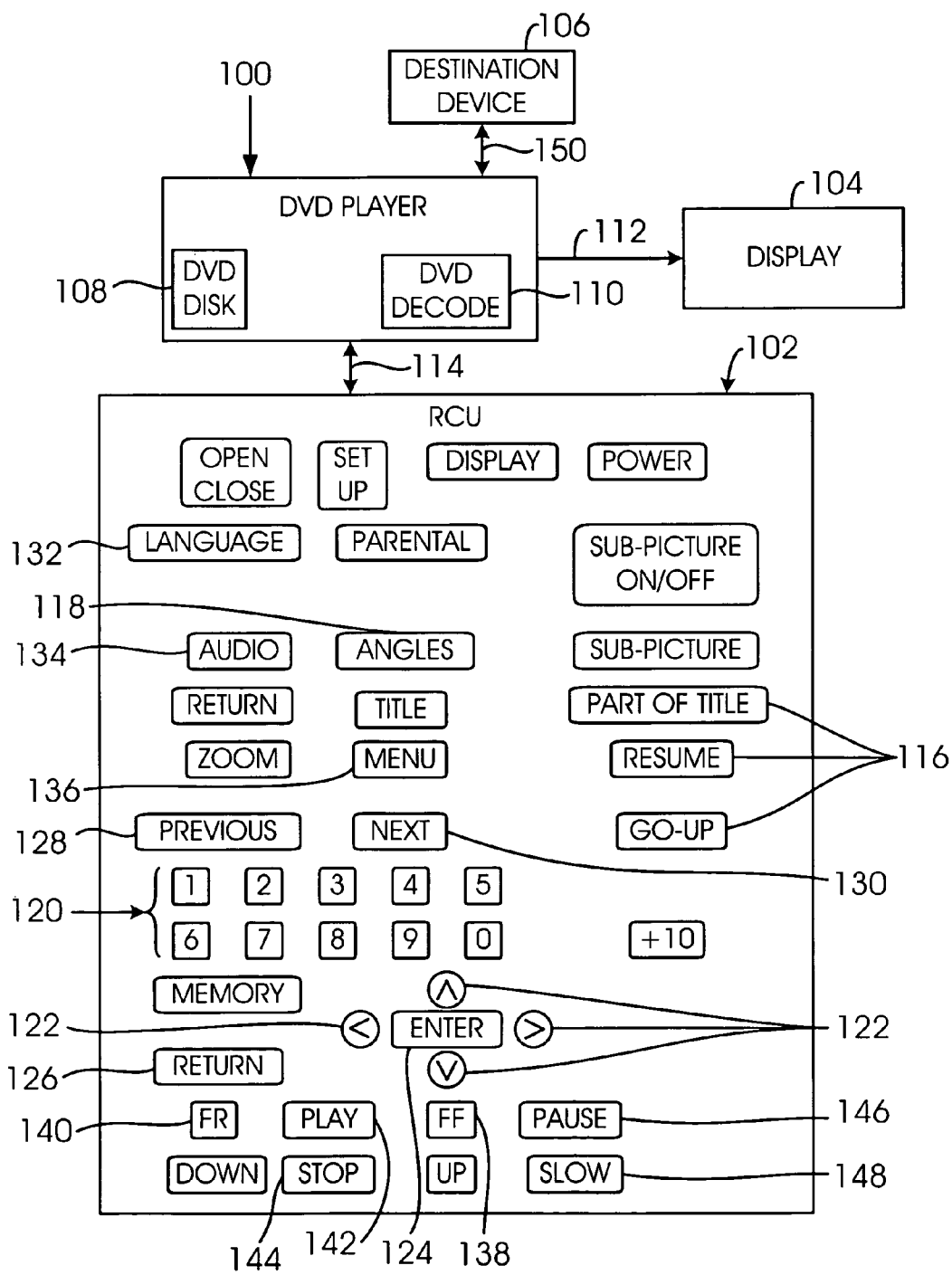
FIG. 1 is a block diagram of a DVD device, remote control unit (RCU), display and remote destination device embodying the present invention.

A DVD player 100, with an exemplary conventional remote control unit (RCU) 102, a display 104 and a remote DVD content playing device 106, is shown in FIG. 1. The DVD player 100 may be a standalone DVD device, a personal-computer (PC), or other DVD-equipped device, with an installed DVD drive and DVD decoder card and a keyboard and/or mouse. In a conventional DVD player 100, a user controls the DVD player 100 with the RCU 102 to present DVD content on the display 104. The display 104 may be any device for displaying video, such as a standard TV or high definition TV (HDTV). The DVD content playing device 106, preferably remote from the DVD player 100, is preferably a DVD player, a PC or other appropriate device for playing DVD content at a remote location. With the improved features of the DVD player 100, the user can interact with the DVD player 100 using the RCU 102 to extract an A/V segment of the DVD content.

Generally, the DVD player 100 comprises a DVD disk 108 connected to a DVD decode unit 110. The DVD disk 108 is typically a removable medium, or other source of DVD content, on which is stored the DVD content. The DVD decode unit 110 generally comprises all of the hardware, firmware and software for retrieving raw bitstream data of the DVD content from the DVD disk 108, decoding the raw bitstream data into viewable video, and sending the viewable video over a cable 112 to the display 104 for presentation. As will be described below, the DVD decode unit 110 also includes the ability to extract the A/V segment from the DVD content.

Figure 4:
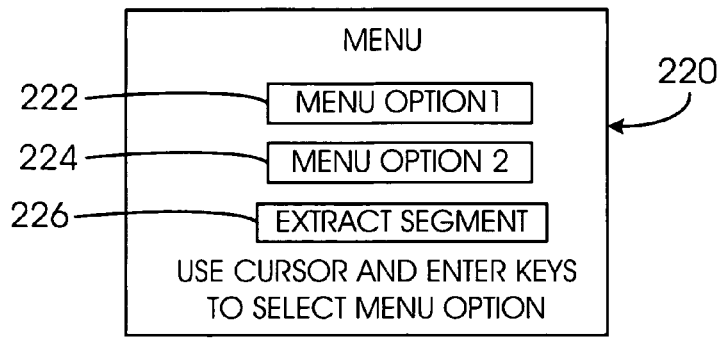
FIG. 4 is an exemplary menu screen, presented on the display shown in FIG. 1, with which a user interacts to enter a procedure to extract an A/V segment from the exemplary DVD bitstream shown in FIG. 2.

The RCU 102 is typically communicates with the DVD player 100 over an infrared (IR) link 114. The RCU 102 generally includes keys 116 for controlling the DVD player 100. The RCU 102 is used to control on-screen menus, as will be described below with reference to FIGS. 6–12. Among others, the keys 116 typically include an angles key 118, number keys 120, cursor keys 122, an enter key 124, a return key 126, a previous key 128, a next key 130, a language key 132, an audio key 134, a menu key 136, a fast forward key 138, a fast reverse key 140, a play key 142, a stop key 144, a pause key 146 and a slow key 148. The menu key 136 is typically used to enter a menu program (FIG. 4) for selecting main menu options, including the option to extract the A/V segment. Other keys 120, 122, 124, 126, 128 and 130 are menu navigation keys typically used to navigate the menus, such as the exemplary menus (shown in FIGS. 4 and 6–12) for extracting the A/V segment. Other keys 118, 132 and 134 are other menu keys typically used to enter other menu screens similar to some of those that will be described below (see FIGS. 9–11). Still other keys 138, 140, 142, 144, 146 and 148 are playback control keys used to control the playback of the DVD A/V content and used to locate the start and stop frames in the DVD A/V content for the A/V segment to be extracted.

Generally, the user operates the RCU keys 116 to select the segment of the DVD A/V content to be extracted and any additional options or features, such as the angle(s), audio track(s) and other features available in the DVD content, to be included in the A/V segment. The user also selects or inputs any identifying information for the A/V segment as will be described below. The extracted A/V segment is assembled into a complete DVD bitstream as would be stored on a complete DVD disk (as described below with reference to FIG. 2), so that the extracted A/V segment can be played back by a conventional DVD player as a complete DVD title. Once the A/V segment and the options and/or features have been selected, the DVD decode unit 110 reads the A/V segment and builds DVD-specific information, such as headers and navigation information, that are required for a completed DVD program that would represent an entire DVD disk for the A/V segment. The DVD content is played back from the DVD disk 108 and the relevant portions of the DVD content are extracted and assembled together with the DVD-specific information to form the completed DVD program for the extracted A/V segment. The extracted A/V segment may be stored locally in the DVD player 100 for local playback or other use or sent to the remote DVD content playing device 106 across a modem or network link 150 for playback, re-editing or other use at the remote DVD content playing device 106.

Figure 2:
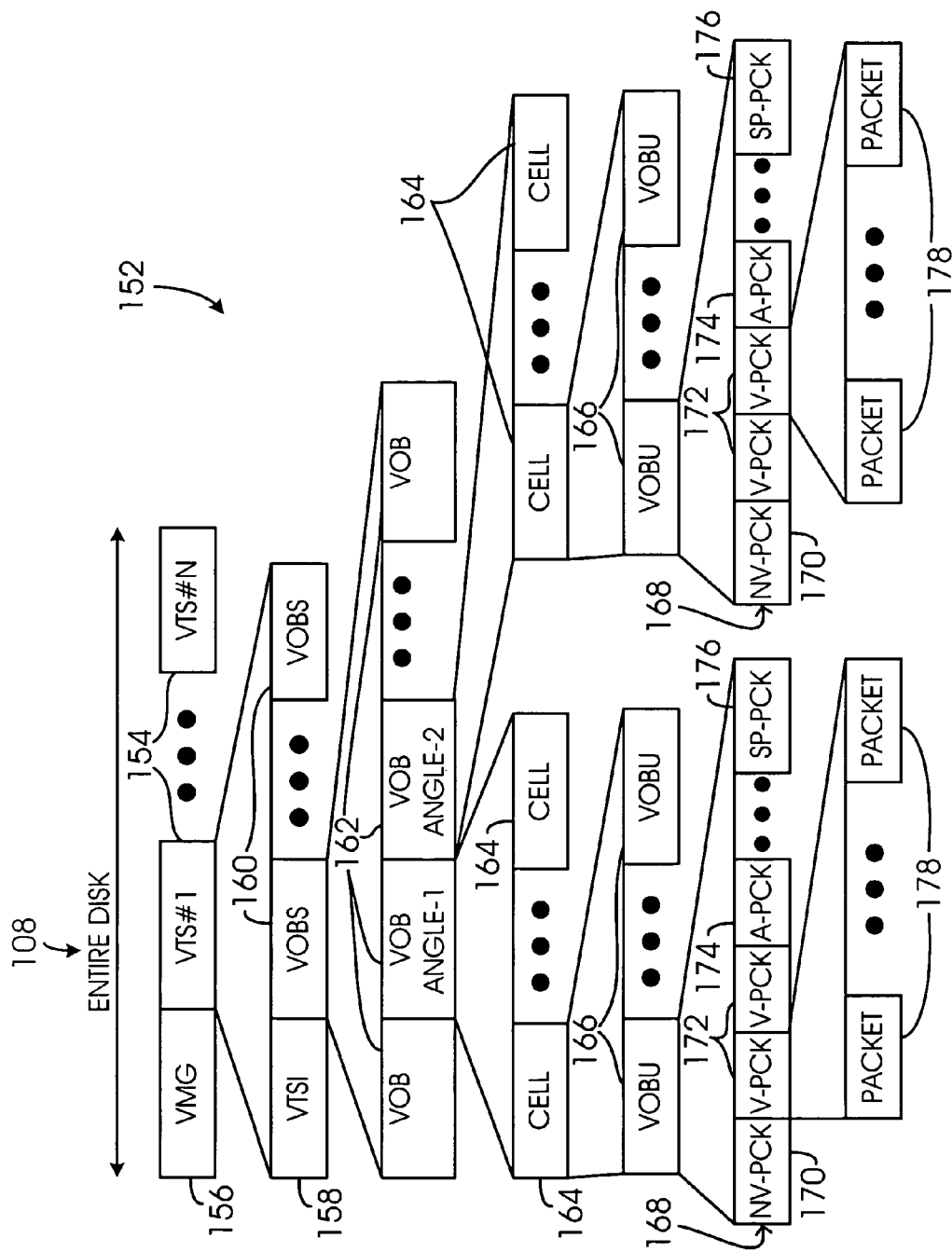
FIG. 2 is an illustration of an exemplary DVD bitstream data structure syntax for DVD content that can be played back by the DVD device shown in FIG. 1, with certain portions of the data structure expanded.

A typical data structure 152 for digital data that comprises the DVD content stored on a DVD disk 108 (FIG. 1) is shown in FIG. 2. Digital data for the DVD content is arranged in a hierarchy of groups or blocks in the data structure 152. At the top of the hierarchy are video title sets (VTS) 154. A VTS 154 typically contains all of the information for a complete title or DVD program, such as a motion picture or a collection of songs. There may be up to 99 VTSs on a DVD disk 108. A special case of the VTS 154 is a video manager (VMG) 156. The VMG 156 essentially contains a main menu for all of the titles available on the entire DVD disk 108. The VMG 156 and the VTSs 154 comprise the entire DVD disk 108.

Each VTS 154 comprises video title set information (VTSI) 158 and up to 99 video object sets (VOBS) 160. The VTSI 158 essentially contains header information and control data for the VTS 154 and the VOBSs 160 that follow. The DVD content for the title is divided up so that each VOBS 160 essentially contains, among other control information for video, audio and subpictures, a portion of the actual DVD content for the title. Additionally, the VOBSs 160 are usually arranged in sequential order.

Each VOBS 160 comprises one or more video objects (VOB) 162. The VOBs 162 essentially contain further subdivisions of the DVD content (video, audio, subpictures, etc.) of the title. If the author of the DVD content did not include multiple angles of scenes or different parental tracks, however, there could potentially be one VOB 162 for the entire title. With multiple angles or parental tracks, though, it is necessary to divide the DVD content into short segments that can be interleaved with corresponding segments of each other angle or track for seamless playback. Thus, each VOB 162 generally contains one short segment of one angle or track. The VOBSs 160 are arranged in groups of VOBs 162 containing corresponding short segments of each angle or track. The DVD player 100 (FIG. 1) reads the raw bitstream data of the data structure 152 from the DVD disk 108 sequentially, so for seamless playback of one angle or track, the DVD player 100 skips over, by reading without storing as it searches for the next desired VOB 162, several VOBs 162 on the DVD disk 108 to get from one VOB 162 to the next VOB 162 for the same angle or track. The amount of time required to skip over the intervening VOBs 162 must be short enough that the DVD player 100 does not finish playing the first VOB 162 before it can start playing the second VOB 162. When playing back the selected A/V segment for extraction, the DVD player 100 simply reads and stores the raw bitstream data for the VOBs 162 for the selected A/V segment and each selected option or feature.

The video objects 162 comprise one or more cells 164. A cell 164 contains a group of pictures in the video stream and/or a group of audio blocks. Each cell 164 comprises video object units (VOBU) 166. Each VOBU 166 may contain about 0.4 to 1.0 seconds of video data or audio, subpicture or control data. Each VOBU 166 comprises packs 168, including one navigation pack (NV-PCK) 170 followed by any number of and any order of video packs (V-PCK) 172, audio packs (A-PCK) 174 and subpicture packs (SP-PCK) 176 containing video, audio and subpicture data, respectively. The packs 168 comprise packets 178 of the actual data. The smallest addressable segment in the DVD content is at the level of the VOBU 166, so the granularity of the A/V segment that can be extracted from the DVD content preferably depends on the VOBUs 166. Thus, the extracted A/V segment is assembled from the available VOBUs 166 between the start and stop points in the DVD content.

The data structure 152 for a complete DVD disk 108 includes considerable menu, header and navigation information within each of its hierarchical blocks that is specific to the complete DVD disk 108, according to conventional DVD formatting. The A/V segment that is to be extracted from the DVD content on the DVD disk 108 is assembled together with such menu, header and navigation information, but this information is generated specifically for the extracted A/V segment. Thus, the DVD player 100 (FIG. 1) parses out each of the blocks of information in the entire disk 108 from the VMG 156 and the VTS 154 down to the smallest addressable segment, the VOBUs 166, to locate and identify the VOBUs 166 that are relevant to the desired A/V segment. Then the DVD player 100 reassembles the relevant VOBUs 166 into a new data structure 152 with its own menu, header and navigation information to form a VMG 156 and VTS 154 that is specific to the extracted A/V segment. The assembled data structure 152 for the extracted A/V segment essentially forms all of the data necessary for a complete stand-alone DVD disk 108, but without necessarily storing the extracted A/V segment to a DVD disk 108.

Figure 3:
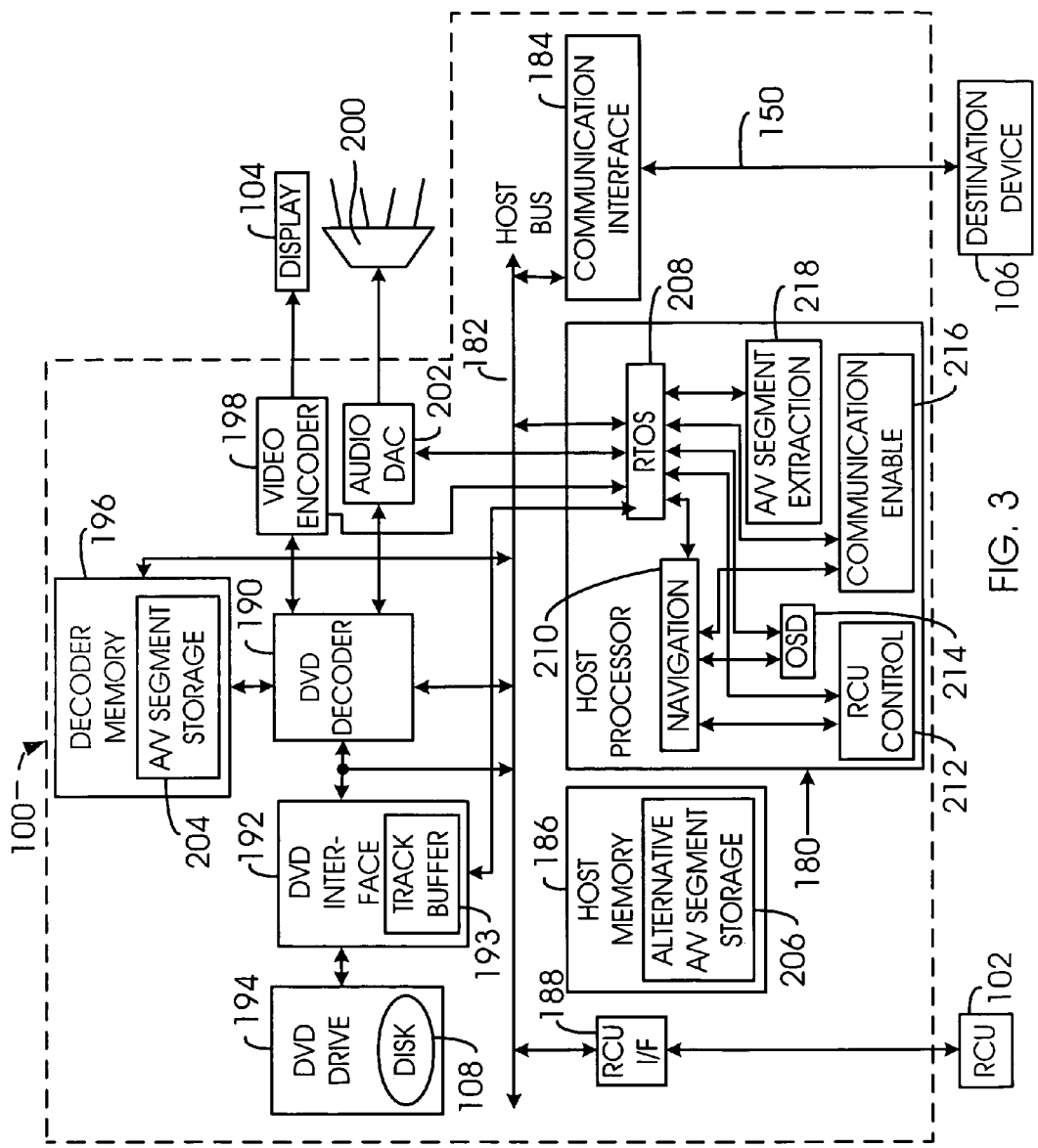
FIG. 3 is a more detailed block diagram of the DVD device shown in FIG. 1, with the display, speakers, the RCU and remote destination device.

The DVD player 100 is shown in greater detail in the block diagram shown in FIG. 3. As is typical in stand-alone DVD players, a host processor 180 controls the functioning of the DVD player 100 and communicates with most of the other elements of the DVD player 100 across a host bus 182, but also may have separate input/output pins or ports (not shown) for communicating with some of the parts of the DVD player 100. The host bus 182 typically includes address and data lines for addressing each of the parts to which it is attached and communicating command data to control these parts.

A conventional communication interface 184 (e.g. modem, network interface card, etc.) is connected to the host bus 182 and to the modem or network link 150 to send and receive communication packets between the DVD player 100 and the remote DVD content playing device 106 (FIG. 1). For example, the DVD player 100 may send an email message with the extracted A/V segment attached thereto to the remote DVD content playing device 106. The host processor 180 communicates over the host bus 182 with the communication interface 184 to control remote communications to and from the destination device 106.

A host memory random access memory (RAM) 186 is connected to the host bus 182 to support the operation of the host processor 180. An RCU interface 188, such as an infrared receiver, is connected to the host bus 182 to communicate with the handheld RCU 102 in optical signal path 189 to allow the user to control or set up the extraction of the A/V segment from the DVD content by using the RCU 102.

The DVD player 100 also has a conventional DVD decoder 190, such as the L64020 or L64021 DVD decoders available from LSI Logic, Inc., attached to the host bus 182 to communicate with and be controlled by the host processor 180. A DVD drive interface 192, including a track buffer 193, connects to the host processor 180 and the DVD decoder 190. The DVD drive interface 192 exchanges control and status signals with the host processor 180. The DVD drive interface 192 exchanges control signals with the DVD decoder 190 and sends the raw bitstream data obtained from the DVD disk 108 by a DVD drive 194 to the DVD decoder 190. The DVD drive 194 is connected to the DVD drive interface 192 to exchange control and status signals and to send the raw DVD bitstream to the DVD drive interface 192. The DVD disk 108, or other medium, is installed in the DVD drive 194 and contains the DVD content, in coded form, from which the selected A/V segment is extracted. The DVD drive 194 may be a conventional DVD drive capable of receiving a removable DVD disk 108, a DVD drive tower with a plurality of such DVD drives, or a hard disk drive configured to emulate a DVD device with an installed DVD medium.

Under control of the host processor 180, for conventional playback of DVD content, the DVD decoder 190 instructs the DVD interface 192 to provide the DVD content (e.g. a video track, an audio track, sub picture information, etc.) requested by the user. For extracting an A/V segment from the DVD content, the DVD decoder 190 instructs the DVD interface 192 to provide all of the relevant portions of the DVD content (e.g. each desired video and audio tracks, including angles and parental tracks; each desired subtitle track; the desired sub picture information; etc.) between a start point and a stop point for the specified A/V segment.

Under control of the host processor 180, the DVD drive interface 192 commands the DVD drive 194 to provide the raw DVD data from the DVD disk 108, which the DVD drive interface 192 buffers in the track buffer 193 and presents to the DVD decoder 190, typically in 8-bit bytes. In this manner, the DVD drive interface 192 maintains a supply of raw bitstream data for the DVD decoder 190 so that if the DVD drive 194 must branch from one part of the DVD disk 108 to another part, the DVD decoder 190 will have a sufficient supply of raw bitstream data to continue decoding the DVD content without a break in the playback during the branching.

The DVD decoder 190 receives the raw DVD data and separates it into the various types of conventional DVD content, such as textual data, programming data, digital video data and digital audio data. The DVD decoder 190 also decompresses encoded DVD data into uncompressed A/V content, such as digital video data that had been compressed into the MPEG 2 (Motion Picture Experts Group) format or digital audio data that had been compressed into the Dolby Digital audio format. A decoder memory RAM 196 is connected to the DVD decoder 190 to support the functioning of the DVD decoder 190. When extracting multiple angles or tracks for the desired A/V segment, the DVD decoder 190 multiplexes as necessary between the raw bitstream data for each of the angles or tracks so as to extract each portion of the DVD content required to form the desired A/V segment. Typically, the DVD decoder 190 is programmed by the host processor 180 with information to select each of the required portions of the DVD content to form the complete A/V segment.

To present the video portion of the DVD content or the video portion of the extracted A/V segment on the display 104, a conventional video encoder 198 is connected to the host processor 180 and to the DVD decoder 190. The video encoder 198 exchanges control signals with the host processor 180. The video encoder 198 exchanges control signals with and receives the decompressed digital video data from the DVD decoder 190. The video encoder 198 typically encodes the digital video data into an analog composite video signal in either the National Television Systems Committee (NTSC) composite color-encoding system typically used in the United States or the Phase Alternate Line (PAL) composite color-encoding system typically used in Europe. The composite video signal is output from the video encoder 198 to the display 104.

To present the audio portion of the DVD content or of the extracted A/V segment on one or more local speakers 200, a conventional audio digital-to-analog converter (DAC) 202 is connected to the host processor 180 for exchanging control signals and connected to the DVD decoder 190 for both exchanging control signals and receiving the decoded digital audio data. The audio DAC 202 converts the digital audio signal into an analog audio signal which can be heard on the local speakers 200.

Whether sending the extracted A/V segment to the destination device 106 or presenting the extracted A/V segment on the local display 104 and speakers 200, an A/V segment storage space 204 is provided in the decoder memory RAM 196 for storing, or buffering, the bitstream for the extracted A/V segment prior to attaching it to an email to be sent to the remote DVD content playing device 106 or providing it to the DVD decoder 190. Alternatively, an A/V segment storage space 206 is provided in the host memory RAM 186, and the DVD interface 192 provides the bitstream for the extracted A/V segment to the host bus 182, so that the host processor 180 can store the relevant portion of the bitstream in the A/V storage space 206. In another alternative, the track buffer 193 is used to buffer data at the pace of sending the data to the destination device 106, so additional storage space 204 or 206 is not needed. The decoder memory RAM 196 is connected to the host bus 182 for routing the extracted A/V segment to the communication interface 184 and the remote DVD content playing device 106. Alternatively, the decoder memory RAM 196 provides the extracted A/V segment to the DVD decoder 190 for routing to the host bus 182.

The extracted A/V segment is buffered in the A/V segment storage space 204 (or 206) prior to sending it to the remote DVD content playing device 106, so that the communication interface 184 can assemble discrete communication packets from the digital data of the A/V segment for sending across the network link 150. For local presentation of the extracted A/V segment on the display 104, however, the extracted A/V segment is provided to the DVD decoder 190, which decodes it and provides the decoded video content to the video encoder 198 and the decoded audio content to the audio DAC 202.

The host processor 180 executes the software that controls the functioning of the DVD player 100. A real-time operating system (RTOS) 208 interfaces between firmware and/or hardware of the DVD player 100 and upper level software applications. A navigation program 210 performs the primary coordination functions for controlling the DVD player 100. An RCU control program 212 communicates with the navigation program 210 and the operating system 208 to cause the exchange of communication signals across the host bus 182 with the RCU interface 188 to receive and process user input commands that control the DVD player 100. An on-screen-display program (OSD) 214 communicates with the navigation program 210 and the operating system 208 to send on-screen display information to the video encoder 198 to overlay video information shown on the display 104 with information or control menus (see e.g. FIGS. 4 and 6–12) regarding the DVD player 100, the DVD content or A/V segment extraction.

A remote communication enabling program 216 enables sending the extracted A/V segment via email through the communication interface 184 to the remote DVD content playing device 106. The communication enabling program 216 communicates with the navigation program 210 and the operating system 208 to build the email packets with the attachments for the extracted A/V segment.

Figure 5:
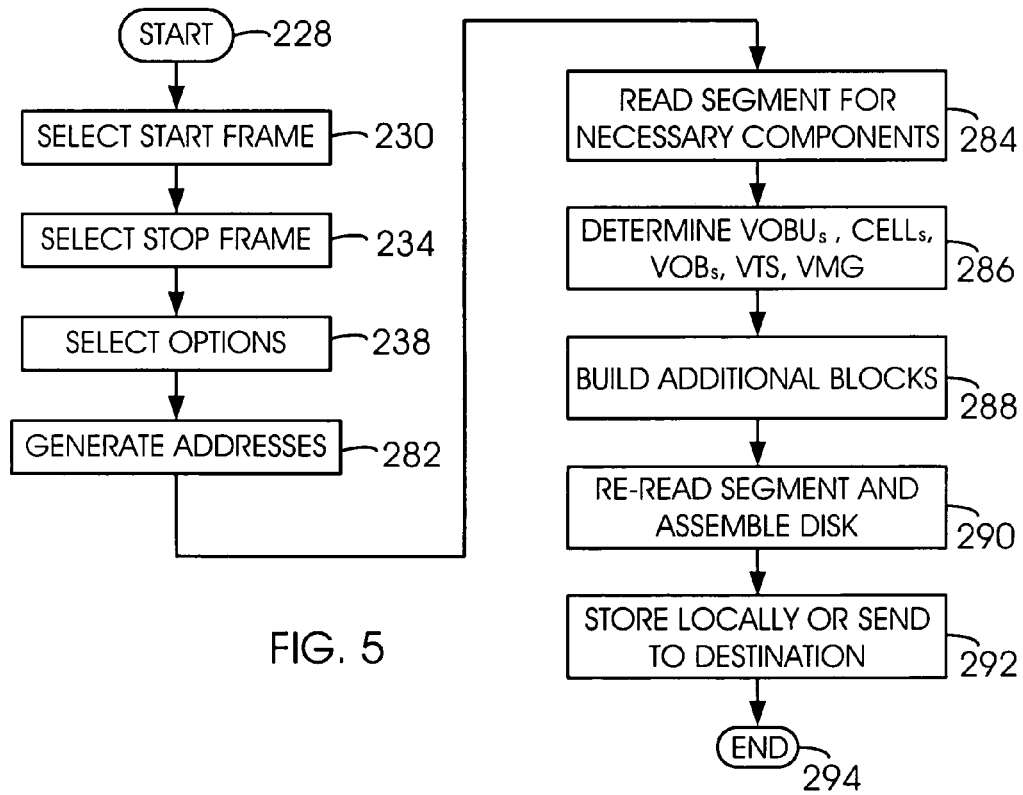
FIG. 5 is a generalized flow chart of a procedure for extracting an A/V segment from the exemplary DVD bitstream shown in FIG. 2, in accordance with the present invention.

An A/V segment extraction program 218 interacts with the navigation program 210 and the operating system 208 to provide the user with the menu screens (FIGS. 4 and 6–12) to initiate and control the A/V segment extraction procedure (FIG. 5). The A/V segment extraction program 218 receives the start point and stop point information input by the user and converts this information into actual addresses for the start and stop frames or VOBUs 166 (FIG. 2) for the A/V segment to be extracted from the DVD content. The start and stop addresses can be extracted from a run-time clock (not shown) that is conventional on typical DVD players. The A/V segment extraction program 218 also receives information that the user inputs regarding the desired options and features to be included in the extracted A/V segment. With the start and stop addresses and the information for the desired options and features, the A/V segment extraction program 218 instructs the DVD decoder 190 to play back the DVD content from the DVD disk 108 through the DVD drive 194 and the DVD interface 192 relating to the desired A/V segment. With this playback, the A/V segment extraction program 218 identifies each of the blocks in the overall data structure 152 (FIG. 2) that are relevant to the desired A/V segment.

With the identified blocks in the data structure 152, the A/V segment extraction program 218 assembles the complete header and navigation information according to the DVD standards to form the relevant VOBUs 166 into cells 164, the cells 164 into VOBs 162, the VOBs 162 into VOBSs 160 with information for an appropriate VTSI 158, the VOBSs 160 and the VTSI 158 into a VTS 154 with information for an appropriate VMG 156 (see FIG. 2). The A/V segment to be extracted is then played back again and the appropriate VOBUs 166 are extracted from the DVD content and assembled with the header and navigation information to form the VMG 156 and the VTS 154. The VMG 156 and the VTS 154 thus created form a complete DVD program for an entire DVD disk 108 (FIG. 2), which is the extracted A/V segment, that can be played back on a conventional DVD player. In an alternative, the extracted A/V segment is formed with uncompressed A/V information that has been decoded by the DVD decoder 190, so that the extracted A/V segment can be played back on a remote DVD content playing device 106 that does not have a DVD decoder.

With sufficient memory in the A/V segment storage space 204 or 206, the entire extracted A/V segment can be assembled and stored for later use or transfer. A larger extracted A/V segment can be generated, without storing the entire extracted A/V segment, by assembling the complete VMG 156 (FIG. 2) and VTS 154 "on-the-fly" as the A/V segment is read from the DVD disk 108, assembled into the VMG 156 and VTS 154 and sent to the DVD decoder 190 for local playback or to the communication interface 184 for remote playback at the remote DVD content playing device 106.

Upon the user pressing the menu key 136 (FIG. 1) on the RCU 102, signals are communicated over the path 189 to the RCU interface 188 (FIG. 3) and to the host processor 180 to cause the navigation program 210 to present a menu screen 220 (FIG. 4) through the OSD program 214 onto the display 104. The menu screen 220 includes various conventional menu options 222 and 224, and also includes an "extract segment" menu option 226, which the user may select to begin a procedure for extracting the desired A/V segment from the DVD content. Typically, the user presses the cursor keys 122 (FIG. 1) to move between the menu options 222, 224 and 226 and presses the enter key 124 (FIG. 1) to select the desired menu option 222, 224 or 226.

Figure 6:
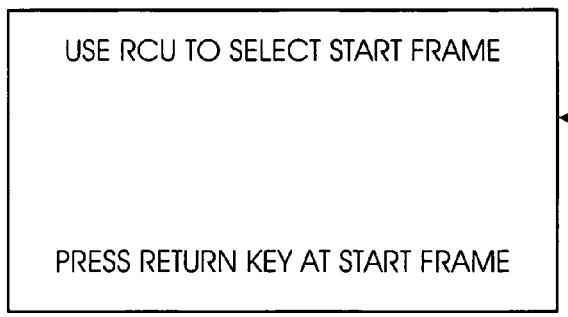
FIGS. 6–12 are exemplary menu screens, presented on the display shown in FIG. 1, with which the user interacts during the procedure shown in FIG. 5.
Figure 7:
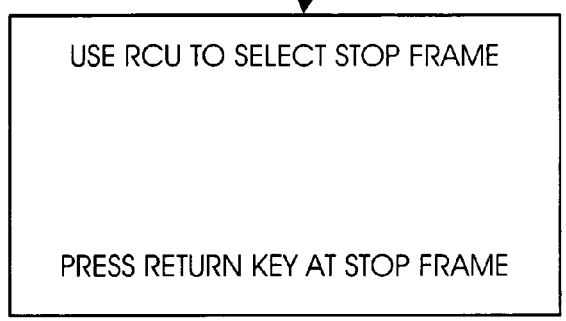

Upon selecting the extract segment menu option 226, the user begins a procedure as shown in FIG. 5 for selecting the A/V segment to be extracted along with each of the options or features to be included in the extracted A/V segment. The extraction procedure begins at step 228 as shown in FIG. 5. At step 230, the user is presented with a menu screen 232, as shown in FIG. 6, which instructs the user to operate the playback control keys 138, 140, 142, 144, 146 and 148 to play back the DVD A/V content to locate the start frame in the DVD A/V content for the A/V segment to be extracted. The user scans through the DVD A/V content for the desired start frame and presses the return key 126 (FIG. 1) to select the start frame. At step 234, the user is presented with a menu screen 236, as shown in FIG. 7, which instructs the user to operate the playback control keys 138, 140, 142, 144, 146 and 148 (FIG. 1) to play back the DVD A/V content again to locate the stop frame in the DVD A/V content for the A/V segment to be extracted. The user scans through the DVD A/V content for the desired stop frame and presses the return key 126 to select the stop frame.

Figure 8:
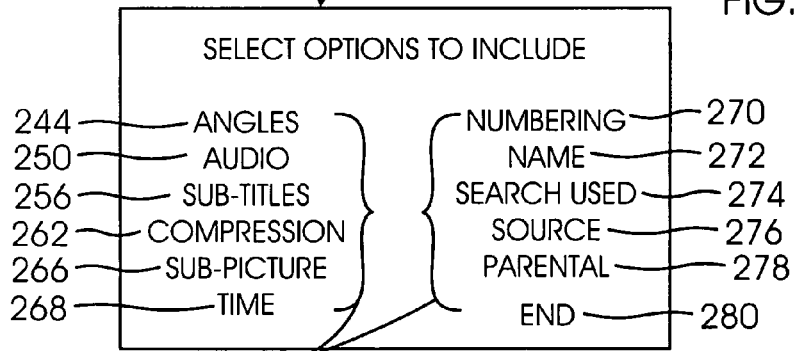

At step 238, the user is presented with an options menu screen 240, as shown in FIG. 8, with which to select the options and features to include in the extracted A/V segment. The user presses the cursor keys 122 (FIG. 1) to highlight an option 242 and presses the enter key 124 (FIG. 1) to select the highlighted option. Selection of an option 242 typically presents the user with another menu with which to specify the parameters of the selected option 242. Other or different options 242 may be made available on the options menu screen 240.

Figure 9:
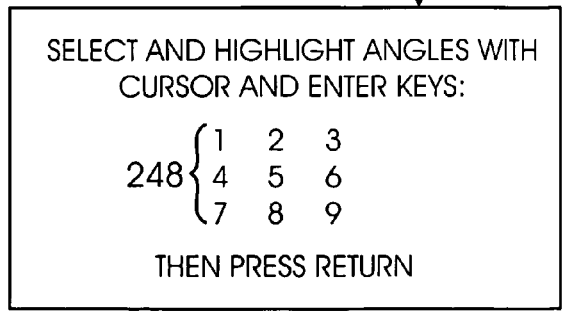

For example, an angles option 244 in the menu screen 240 presents the user with a menu screen 246 as shown in FIG. 9. This menu screen is similar to the menu screen with which the user will be presented when the user presses the angles key 118 (FIG. 1). Instead of selecting one angle to view, however, the user selects each desired one of the available angles 248 to include in the extracted A/V segment. The user selects an angle 248 by using the cursor keys 122 (FIG. 1) and highlights each selected angle 248 by pressing the enter key 124 (FIG. 1). Once each desired angle 248 has been highlighted, the user presses the return key 126 (FIG. 1) to return to the options menu screen 240 to select the next option.

Figure 10:
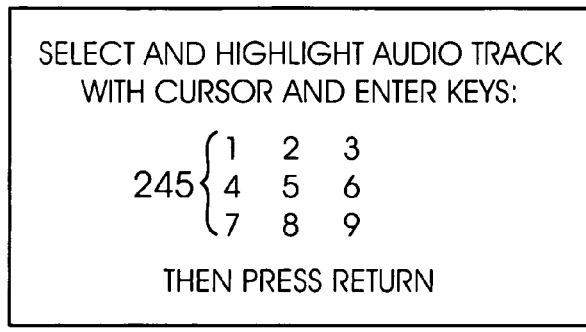

An audio option 250 in the menu screen 240 (FIG. 8) presents the user with a menu screen 252 as shown in FIG. 10. This menu screen 252 is similar to a menu screen that is presented upon pressing the audio key 134 (FIG. 1). Instead of selecting one audio track 254 to which the user listens during playback of the DVD content, however, the user selects each desired one of the available audio tracks 254 to include in the extracted A/V segment. The user selects and highlights each desired audio track 254 by pressing the cursor keys 122 (FIG. 1) and the enter key 124 (FIG. 1) and then presses the return key 126 (FIG. 1) to return to the options menu screen 240 (FIG. 8).

Figure 11:
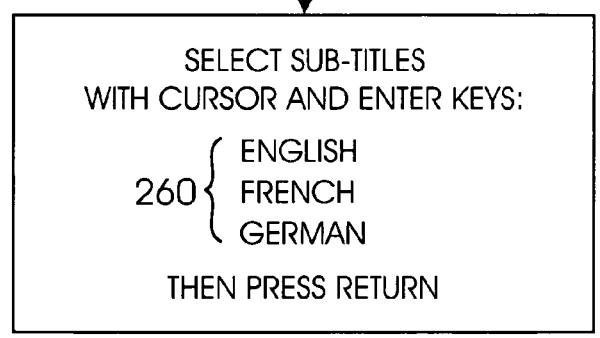

A subtitles option 256 in the menu screen 240 (FIG. 8) presents the user with a menu screen 258 as shown in FIG. 11. This menu screen 258 is similar to a menu screen that is presented upon pressing the language key 132 (FIG. 1). Instead of selecting a subtitle 260 for one language, however, the user selects each desired one of the available subtitles 260 to include in the extracted A/V segment. The user selects and highlights each desired subtitle 260 by pressing the cursor keys 122 (FIG. 1) and the enter key 124 (FIG. 1) and then presses the return key 126 (FIG. 1) to return to the options menu screen 240 (FIG. 1).

Figure 12:
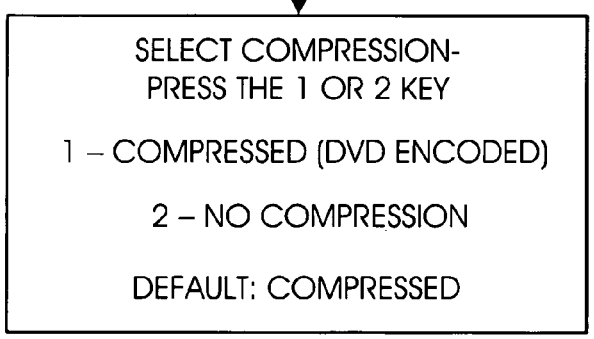

A compression option 262 in the menu screen 240 (FIG. 8) presents the user with a menu screen 264 as shown in FIG. 12. In this menu screen, the user is instructed to press the number "1" key 120 (FIG. 1), for example, to select DVD-encoded compression for the extracted A/V segment or press the number "2" key 120, for example, to select no compression (fully decompressed A/V content) for the extracted A/V segment. After pressing either the number "1" or "2" key 120, the extraction procedure returns to the options menu screen 240 (FIG. 8). If the user does not select the compression option 262 (FIG. 8), then the extraction procedure defaults to DVD-encoded compression as shown in FIG. 12.

Likewise, a subpicture option 266 in the menu screen 240 (FIG. 8) presents the user with a menu screen (not shown) for selecting the option to display an image using conventional subpicture unit overlay capabilities of the typical DVD player to display the options that are available or included in the extracted A/V segment. A time option 268 (FIG. 8) presents the user with a menu screen (not shown) for selecting the option to include the time period at which the extracted A/V segment occurs within the DVD content. A numbering option 270 (FIG. 8) presents the user with a menu screen (not shown) for selecting the option to number the extracted A/V segment to distinguish it from other extracted A/V segments. A name option 272 (FIG. 8) presents the user with a menu screen (not shown) for selecting the option to include the name of the person who extracted the A/V segment. A search-used option 274 (FIG. 8) presents the user with a menu screen (not shown) for selecting the option to include a description of any type of search that was used to locate the extracted A/V segment from the DVD content. A source option 276 (FIG. 8) presents the user with a menu screen (not shown) for selecting the option to describe, or provide the title of, the original source DVD content from which the A/V segment was extracted. A parental option 278 (FIG. 8) presents the user with a menu screen (not shown) for selecting parental control features, if available, for the extracted A/V segment. When the user has completed specifying each of the desired options 242, the user selects an end option 280 (FIG. 8) to exit the options menu screen 240.

At step 282 of the extraction procedure shown in FIG. 5, the start and stop addresses for the A/V segment to be extracted are generated from the start and stop information selected by the user in steps 230 and 234. The specified A/V segment is read from the DVD disk 108 (FIGS. 1 and 3) at step 284 to determine, according to standard DVD formatting procedures, all of the headers, navigational information and other components needed to assemble the final extracted A/V segment into a complete DVD title. At step 286, the VOBUs 166 in the DVD content that are necessary for forming the extracted A/V segment are determined from the data read at step 284, and each of the cells 164, VOBs 162, VOBSs 160, the VTS 154 and the VMG 156 in the hierarchy of the data structure 152 (FIG. 2) for the completed DVD title are also determined. At step 288, given the header and navigation information that has been determined at step 284, each of the additional blocks of information in the data structure 152 that are to be assembled with the necessary VOBUs 166 to form the completed DVD disk 108 of the extracted A/V segment are built. At step 290, the A/V segment is re-read from the DVD content and the necessary VOBUs 166 are assembled with the additional blocks of information assembled at step 288 to form the completed DVD title representing the extracted A/V segment. At step 292, the extracted A/V segment is either stored locally in the A/V segment storage space 204 or 206 (FIG. 3) or sent to the remote DVD content playing device 106 (FIG. 3). The extraction procedure ends at step 294.

The invention has the advantage of permitting the user to extract a segment of the DVD A/V content without any loss of the DVD features. Thus, any desired features that are available in the segment to be extracted from the DVD content can be preserved in the extracted A/V segment. The user is also assured of the exact starting and stopping points, down to the smallest addressable segment of the DVD content, for the extracted A/V segment. The extracted A/V segment forms a complete DVD data structure for a DVD title that can be played back by a conventional DVD player or a computer which has the capability to play back DVD content. Alternatively, the DVD content can be decompressed prior to forming the extracted A/V segment, so it can be played back on a device that does not have a DVD decoder, such as a typical personal computer. Additionally, the extracted A/V segment is a full-featured DVD data structure that can be stored locally by the user or sent to a remote destination device for playback, re-editing or other use.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of creating a selected segment of DVD formatted audio/visual data capable of being played on a DVD player from playable source DVD data, the playable source DVD data including audio/visual (A/V) content data and DVD formatting data for the content data, the A/V content data of the source DVD data formed by blocks of data, the method comprising:

instructing a user to (i) display a start frame using one or more playback control keys while the source DVD data is played back and (ii) identify the frame being displayed as the start frame by pressing a predetermine key;

instructing the user to (i) display a stop frame using the one or more playback control keys while the source DVD data is played back and (ii) identify the frame being displayed as the stop frame by pressing the predetermine key;

selecting a start point and a stop point within the source DVD data, based on the start frame and the stop frame identified by the user, to establish the extent of the selected segment as less than all of the source DVD data;

identifying blocks of data within the source DVD data as constituting the A/V content data of the selected segment;

copying the identified blocks of data;

determining DVD formatting data for the identified blocks of data; and assembling (i) the identified blocks of data and (ii) the DVD formatting data determined for the identified blocks of data such that the assembled data can be played by a DVD player.

2. A method as defined in claim 1 further comprising the steps of:

identifying the blocks of DVD content data by playing back the source DVD data and reading the blocks of data between the start point and the stop point; and assembling the selected playable segment of DVD formatted A/V data by playing back the source DVD data a second time, reading the blocks of data between the start point and stop point again, copying the identified blocks of data, and combining the copied blocks of data with the determined DVD formatting data.

3. A method as defined in claim 1 further comprising the step of:

sending the selected playable segment of DVD formatted A/V data to a remote DVD device.

4. A method as defined in claim 3 further comprising the step of:

sending the selected playable segment of DVD formatted A/V data as soon as the selected playable segment of DVD formatted A/V data is assembled without copying the selected playable segment of DVD formatted A/V data to a local memory.

5. A method as defined in claim 4 further comprising the steps of:

sequentially assembling a plurality of sub-portions of the selected playable segment of DVD formatted A/V data; and sending each sub-portion while concurrently assembling the next sequential sub-portion.

6. A method as defined in claim 3 further comprising the step of:

temporarily buffering the selected playable segment of DVD formatted A/V data in a local storage buffer at a pace of the sending step.

7. A method as defined in claim 1 further comprising the step of:

storing the selected playable segment of DVD formatted A/V data in a local memory.

8. A method as defined in claim 1, wherein the start and stop points are indicated by time information, further comprising the step of:

converting the start and stop points from the time information into addresses of necessary addressable segments of the content data.

9. A method as defined in claim 1 further comprising the steps of:

selecting non-DVD-standard information that relates to or identifies the segment of DVD content and/or the extraction of the segment; and assembling the selected playable segment of DVD formatted A/V data from the selected non-DVD-standard information.

10. A method as defined in claim 9 further comprising the step of:

selecting the non-DVD standard information from options including extraction time, segment number, user's name, search used and segment source.

11. A method as defined in claim 9 further comprising the step of:

displaying the non-DVD standard information with conventional DVD subpicture unit overlay capabilities.

12. A method as defined in claim 1, wherein the DVD content data includes conventional DVD features, and the method further comprises the steps of:
selecting at least one of the conventional DVD features to be included in the selected playable segment of DVD formatted A/V data; and
identifying blocks of data from the content data relating to the selected DVD features.

13. A method as defined in claim 1 wherein the copied blocks of the content data are compressed.

14. A method as defined in claim 1 wherein the copied blocks of the content data are uncompressed.

15. A DVD device which interacts with a media containing a first DVD data structure capable of being played back by a conventional DVD player and which includes a desired segment of DVD content, comprising:
a DVD drive receptive of the media;
a DVD decoder connected to the DVD drive;
a controller connected to the DVD drive and the DVD decoder and operative to control the DVD drive to supply signals from the media and to control the DVD decoder to assemble the first DVD data structure from the signals supplied by the DVD drive, wherein the controller is further operative (i) to instruct a user to display a start frame using one or more playback control keys while the source DVD data is played back, (ii) to identify the frame being displayed as the start frame in response to the user pressing a predetermine key, (iii) to instruct the user to display a stop frame using the one or more playback control keys while the source DVD data is played back, (iv) to identify the frame being displayed as the stop frame in response to the user pressing the predetermine key, (v) to identify the desired segment from the first DVD data structure based on the start frame and the stop frame identified by the user while said first DVD data structure is played back, (vi) to control the DVD decoder to read the desired segment from the DVD content of the first DVD data structure, and
(vii) to assemble the desired segment into a second DVD data structure such that the desired segment can be played back by a conventional DVD player.

16. A DVD device as defined in claim 15 wherein:
the desired segment comprises a start point and stop point determined by the start frame and the stop frame provided by the user to identify the desired segment; and
the controller identifies the desired segment from the start point and the stop point.

17. A DVD device as defined in claim 16 wherein:
the DVD content comprises conventional DVD features between the start point and the stop point for the desired segment; and
the second DVD data structure comprises desired ones of the conventional DVD features included by the controller.

18. A DVD device as defined in claim 15 wherein:
the second DVD data structure comprises non-DVD-standard information related to or identifying the desired segment and/or the extraction of the desired segment, the non-DVD-standard information is provided by a user and included by the controller in assembling the second DVD data structure.

19. A DVD device as defined in claim 15 further comprising:
a communication interface connected to the DVD decoder and the controller and which communicates with a remote device, wherein the controller routes the second DVD data structure to the communication interface, which sends the second DVD data structure to the remote device.

20. A DVD device as defined in claim 19 wherein:
the controller assembles the second DVD data structure in sequential portions thereof and routes each portion to the communication interface while assembling the next sequential portion; and
the communication interface sends each sequential portion upon receipt thereof to the remote device.

21. A DVD device as defined in claim 15 further comprising:
a memory device in communication with the DVD decoder and the controller, wherein the controller stores the second DVD data structure in the memory device.

* * * * *